(12) United States Patent
Zou et al.

(10) Patent No.: US 10,007,387 B2
(45) Date of Patent: Jun. 26, 2018

(54) DISPLAY DEVICE, PRESSURE DETECTING METHOD AND PRESSURE DETECTING DEVICE

(71) Applicant: BOE TECHNOLOGY GROUP CO., LTD., Beijing (CN)

(72) Inventors: Xiangxiang Zou, Beijing (CN); Jiayang Zhou, Beijing (CN); Xuefei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/324,452

(22) PCT Filed: Jan. 25, 2016

(86) PCT No.: PCT/CN2016/071969
§ 371 (c)(1),
(2) Date: Jan. 6, 2017

(87) PCT Pub. No.: WO2017/045328
PCT Pub. Date: Mar. 23, 2017

(65) Prior Publication Data
US 2017/0212616 A1    Jul. 27, 2017

(30) Foreign Application Priority Data
Sep. 18, 2015    (CN) .......................... 2015 1 0601129

(51) Int. Cl.
*G06F 3/041*    (2006.01)
*G06F 3/044*    (2006.01)

(52) U.S. Cl.
CPC .... *G06F 3/044* (2013.01); *G06F 2203/04102* (2013.01); *G06F 2203/04105* (2013.01)

(58) Field of Classification Search
CPC ........... G06F 3/044; G06F 2203/04102; G06F 2203/04105
See application file for complete search history.

(56) References Cited

U.S. PATENT DOCUMENTS 6,159,761 A * 12/2000 Okada ................. G01P 15/0802
438/462
2009/0278815 A1   11/2009 Li et al.
(Continued)

FOREIGN PATENT DOCUMENTS

| CN | 102138120 A | 7/2011 |
|----|----|----|
| CN | 103246391 A | 8/2013 |

(Continued)

OTHER PUBLICATIONS

International Search Report and Written Opinion (including English translation of Box V.) dated Jun. 22, 2016, for corresponding PCT Application No. PCT/2016/071969.
(Continued)

*Primary Examiner* — Towfiq Elahi
(74) *Attorney, Agent, or Firm* — Kinney & Lange, P.A.

(57) ABSTRACT

Disclosed is a display device, a pressure detecting method and a pressure detecting device. Since a FPC electrode disposed on a side of a FPC board facing a display panel, an upper electrode for grounding disposed on a side of the display panel facing the flexible printed board and an elastically deformable dielectric material disposed between the FPC electrode and the upper electrode and contacting therewith respectively are additionally disposed between the FPC board and the upper electrode, or a FPC electrode disposed on a side of a FPC board facing a support frame and an elastically deformable dielectric material disposed between the FPC electrode and the support frame and contacting therewith respectively are additionally disposed between the FPC board and the support frame, it is possible (Continued)

to detect a magnitude of a pressure exerted on the display panel, thereby overcoming the defect that the existing display device can not realize pressure detection, thus improving user experience.

13 Claims, 4 Drawing Sheets

(56) References Cited

U.S. PATENT DOCUMENTS

| | | | | |
|---|---|---|---|---|
| 2010/0026657 | A1* | 2/2010 | Gettemy | G06F 3/0412 345/174 |
| 2012/0154309 | A1* | 6/2012 | Yoshifusa | G06F 3/045 345/173 |
| 2013/0141664 | A1* | 6/2013 | Toyoyama | G02F 1/1333 349/59 |
| 2013/0199915 | A1* | 8/2013 | Guard | G06F 3/044 200/600 |
| 2014/0152618 | A1* | 6/2014 | Ando | G06F 3/044 345/174 |
| 2016/0188082 | A1* | 6/2016 | Ham | G06F 3/0416 345/174 |

FOREIGN PATENT DOCUMENTS

| | | |
|---|---|---|
| CN | 104714672 A | 6/2015 |
| CN | 104834419 A | 8/2015 |
| CN | 104881193 A | 9/2015 |
| CN | 105183230 A | 12/2015 |
| CN | 204945977 U | 1/2016 |

OTHER PUBLICATIONS

First Chinese Office Action, for Chinese Patent Application No. 201510601129.2, dated Apr. 28, 2016, 13 pages.
Second Chinese Office Action, for Chinese Patent Application No. 201510601129.2, dated Nov. 3, 2016, 12 pages.
Third Chinese Office Action, for Chinese Patent Application No. 201510601129.2, dated Mar. 3, 2017, 11 pages.
Chinese Search Report dated Feb. 3, 2016, for corresponding Chinese Application No. 20151061129.2.

* cited by examiner

DISPLAY DEVICE, PRESSURE DETECTING METHOD AND PRESSURE DETECTING DEVICE

CROSS-REFERENCE TO RELATED APPLICATION

This application is a national stage application of PCT/CN2016/071969 field on Jan. 25, 2016 and claims the benefit of Chinese Patent Application No. CN201510601129.2 filed on Sep. 18, 2015 in the State Intellectual Property Office of China, the whole disclosure of which is incorporated herein by reference.

BACKGROUND OF THE INVENTION

Field of the Invention

Embodiments of the present application relate to the field of display technique, in particular to a display device, a pressure detecting method and a pressure detecting device.

Description of the Related Art

As the standard of living rises continuously, users require more functions of an electronic product. Typically, one electronic product is required to realize several functions. For example, it requires that a display device can realize a pressure detection function while realizing a display function.

However, as shown in FIG. 1, a conventional display device mainly comprises a display panel 11, a support frame 12 for grounding, a flexible printed circuit (FPC) 13 disposed between the display panel 11 and the support frame 12 and the like. Thus, the display device can only realize display function. When an external force is exerted on the display panel 11, the display device cannot detect the magnitude of the external force, i.e., cannot realize a detection of a pressure exerted on the display panel 11, which causes the display device not to have abundant functions so as not to meet the requirements of the user, thereby resulting in poor user experience.

SUMMARY OF THE INVENTION

Embodiments of the present application provide a display device comprising a display panel, a support frame for grounding, and a flexible printed circuit board (FPC) disposed between the display panel and the support frame. The display device further comprises: a FPC electrode disposed on a side of the FPC board facing the display panel; an upper electrode for grounding disposed on a side of the display panel facing the FPC board; and an elastically deformable dielectric material disposed between the FPC electrode and the upper electrode and contacting therewith respectively.

Embodiments of the present application further provide a pressure detecting method based on the display device as described above. The method comprises steps of: detecting a change value of capacitance between the upper electrode and the FPC electrode when an external force is exerted on the display panel; and determining a magnitude of a pressure exerted on the display panel based on the detected change value of capacitance.

Embodiments of the present application also provide a pressure detecting device based on the display device as described. The pressure detecting device comprises a detection unit for detecting a change value of capacitance between the upper electrode and the FPC electrode when an external force is exerted on the display panel, and a processing unit for determining a magnitude of a pressure exerted on the display panel based on the detected change value of capacitance.

Embodiments of the present application further provide another display device comprising a display panel, a support frame for grounding, and a FPC board disposed between the display panel and the support frame. The display device further comprises a FPC electrode disposed on a side of the FPC board facing the support frame, and an elastically deformable dielectric material disposed between the FPC electrode and the support frame and contacting therewith respectively.

Embodiments of the present application also provide a pressure detecting method based on another display device as described above. The method comprises steps of: detecting a change value of capacitance between the upper electrode and the FPC electrode when an external force is exerted on the display panel; and determining a magnitude of a pressure exerted on the display panel based on the detected change value of capacitance.

Embodiments of the present application further provide a pressure detecting device for another display device as described above. The pressure detecting device comprises a detection unit for detecting a change value of capacitance between the upper electrode and the FPC electrode when an external force is exerted on the display panel, and a processing unit for determining a magnitude of a pressure exerted on the display panel based on the detected change value of capacitance.

With the display device, the pressure detecting method and the pressure detecting device according to embodiments of the present application, by adding a FPC electrode on the side of the FPC board facing the display panel, adding an upper electrode for grounding on the side of the display panel facing the flexible printed board and adding an elastically deformable dielectric material disposed between the FPC electrode and the upper electrode and contacting therewith respectively, or by adding a FPC electrode on a side of a FPC board facing a support frame between the FPC board and the support frame and adding an elastically deformable dielectric material disposed between the FPC electrode and the support frame and contacting therewith respectively, it is possible to detect the magnitude of a pressure exerted on the display panel by detecting a change value of capacitance between the upper electrode and the FPC electrode or between the FPC electrode and the support frame, when an external force is exerted on the display panel, thereby overcoming a defect that the existing display device can not realize pressure detection, thus improving user experience.

BRIEF DESCRIPTION OF THE DRAWINGS

In order to clearly describe schemes of embodiments of the present application, accompanying drawings necessary for describing the embodiments of the present application will be briefly described. Apparently, the accompanying drawings merely show some embodiments of the present application, and those ordinary skilled in the art may obtain other drawings based on these accompanying drawings without any inventive steps.

DETAILED DESCRIPTION OF PREFERRED EMBODIMENTS OF THE INVENTION

In order to easily and clearly understand the objects, features and advantages of the present application, the technical schemes of the embodiments of the present application will be described in detail below with reference to the accompanying drawings. Apparently, the described embodiments are merely some embodiments of the present application, rather than all embodiments of the present application. All other embodiments obtained by those ordinary skilled in the art based on the embodiments described herein without any inventive steps will fall within the scope of the present application.

Figure 1:
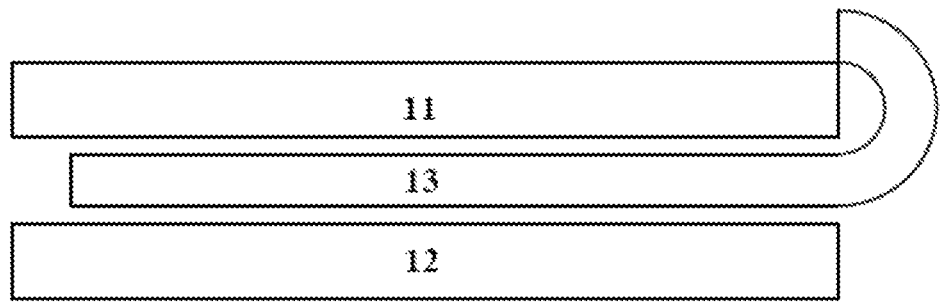
FIG. 1 is a schematic structural view of a conventional display device in the prior art.
Figure 2:
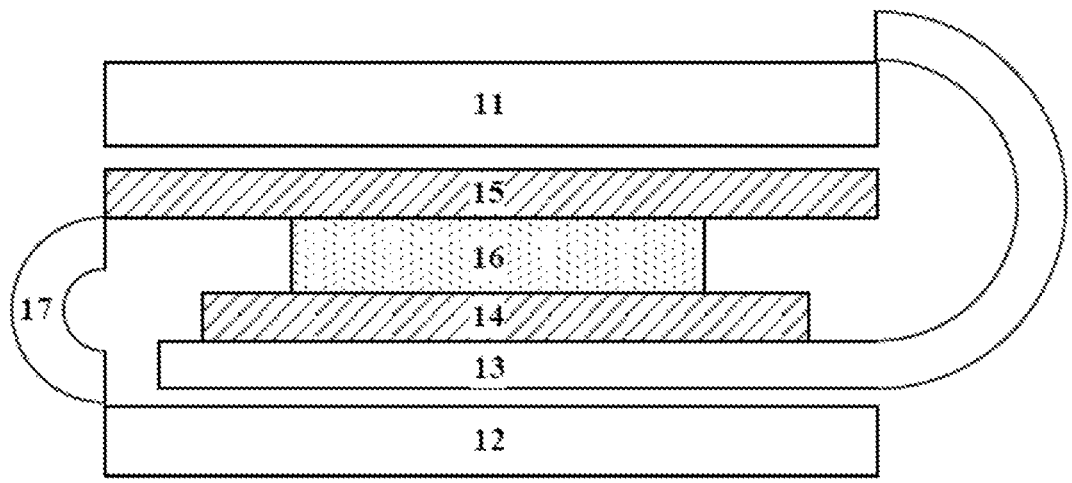
FIG. 2 is a schematic structural view of a display device according to an embodiment of the present application.

In order to overcome the defect in which the existing display cannot detect a pressure, the present application provides a display device. Specifically, FIG. 2 shows a schematic structural view of a display device according to an embodiment of the present application. The display device may comprise a display panel 11, a support frame 12 for grounding, and a FPC board (FPC) 13 disposed between the display panel 11 and the support frame 12.

The display device may further comprise: a FPC electrode 14 disposed on a side of the FPC 13 facing the display panel 11; an upper electrode 15 for grounding disposed on a side of the display panel 11 facing the FPC 13; and an elastically deformable dielectric material 16 disposed between the FPC electrode 14 and the upper electrode 15 and contacting therewith respectively.

With the above configuration, when an external force is exerted onto the display panel 11, the elastically deformable dielectric material 16 will be elastically deformed, which in turn changes a distance between the upper electrode 15 and the FPC electrode 14, thereby changing a capacitance between the upper electrode 15 and the FPC electrode 14. Thus, it is possible to determine a magnitude of a pressure exerted on the display panel 11 by detecting a change value of capacitance between the upper electrode 15 and the FPC electrode 14, thereby overcoming the defect that the existing display device cannot detect the pressure, and thus improving user experience.

Note that, the display panel 11 typically comprises three portions: a color filter substrate (CF), an array substrate and a backlight module (BLU). Typically, the BLU may be disposed on a side facing the FPC 13 and the support frame 12, and the CF may be disposed on a side away from the FPC 13 and the support frame 12, and the array substrate may be disposed between the CF and the BLU.

Specifically, the display panel 11 according to an embodiment of the present application may include a Twisted Nematic (TN) panel, an In-Plane Switching (IPS) panel, a Continuous Pinwheel Alignment (CPA) panel, an Advanced Super Dimension Switch (ADSDS) panel, a Multi-domain Vertical Alignment (MVA) panel, a Patterned Vertical Alignment (PVA) panel and the like, and the present application is not intended to make any restriction on the display panel.

Specifically, the elastically deformable dielectric material 16 refers to a material capable of deforming under a pressure and immediately rebounding to its initial state when the pressure is removed. The dielectric material 16 may include foam. Of course, the dielectric material 16 may include rubber, resin or the like, and the present application is not intended to make any restriction thereon.

Figure 3:
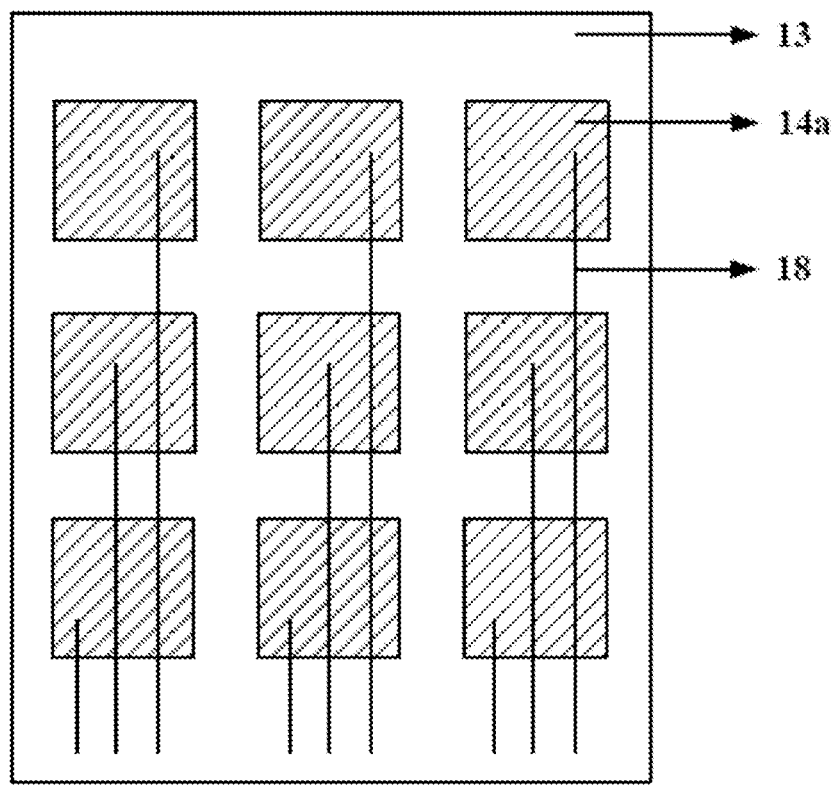
FIG. 3 is a schematic view of a matrix-type electrode including a plurality of sub-electrodes arranged in a matrix form according to an embodiment of the present application.

Further, the FPC electrode 14 may include a plate electrode, i.e., occupying a whole surface. Alternatively, the FPC electrode 14 may be a matrix-type electrode including a plurality of sub-electrodes arranged in a matrix. FIG. 3 shows a schematic structural view of matrix-type FPC electrode 14 including a plurality of sub-electrodes arranged in a matrix.

Note that, when the FPC electrode 14 is the matrix-type electrode including the plurality of sub-electrodes arranged in the matrix, a shape of each of the sub-electrodes included in the FPC electrode 14 may be determined as desired. For example, each of the sub-electrodes may have a square shape as shown in FIG. 3, or a strip shape, a triangle shape or the like, and the description in detail will be omitted in the present embodiment.

Similarly, the upper electrode 15 may include a plate electrode, i.e., occupying a whole surface. Alternatively, the upper electrode 15 may be a matrix-type electrode including a plurality of sub-electrodes arranged in a matrix.

That is, the upper electrode 15 on one hand may be used as one electrode of a capacitor, and on the other hand may function to shield signals, so that the respective electrodes and metal wires in the display device will generate less effect on the pressure sensor, thereby improving anti-interference performance to further improve the user experience.

Note that, when the FPC electrode 14 is the matrix-type electrode including the plurality of sub-electrodes arranged in a matrix, the upper electrode 15 may be generally set as a matrix-type electrode including a plurality of sub-electrodes arranged in a matrix in order to realize a multi-point detection well. Further, the plurality of sub-electrodes of the upper electrode 15 correspond to the plurality of sub-electrodes of the FPC electrode 14 one by one.

Specifically, a material of each of the FPC electrode 14 and the upper electrode 15 may be a metallic conductive material such as gold, silver, cooper or the like or a non-metallic conductive material such as tin indium oxide (TIO), graphene, carbon nano-tube or the like, and the present application is not intended to make any restriction thereon.

Typically, the upper electrode 15 may be connected to the support frame by conductive adhesive 17 so as to be grounded indirectly. The conductive adhesive may be any adhesive capable of realizing electrical conduction. The present application is not intended to make any restriction thereon.

Further, the FPC electrode 14 is connected to a wiring layer of the FPC 13 through metal wiring 18.

Figure 4:
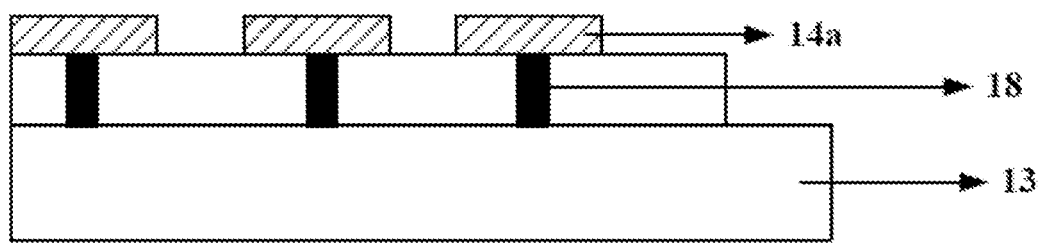
FIG. 4 is a schematic view showing connection of the respective sub-electrodes of matrix-type FPC electrode with a FPC according to an first embodiment of the present application.

For example, as shown in FIG. 4, each of the sub-electrodes 14a in the FPC electrode 14 may be connected with the FPC 13 through a respective metal wiring 18. The metal wiring may be any metal material having conductivity such as gold, silver, cooper or the like and can be selected as desired, and the present application is not intended to make any restriction thereon.

Further, note that, the display device according to the embodiments of the present application may be applicable to an electronic product such as a mobile phone, a flat television (LCD and PDP), a laptop, a digital camera or the like, and the present application is not intended to make any restriction herein.

With the display device according to the embodiment of the present application, since the FPC electrode disposed on the side of the FPC facing the display panel, the upper electrode disposed on the side of the display panel facing the FPC for grounding, and the elastically deformable dielectric material disposed between the FPC electrode and the upper electrode and contacting therewith respectively are additionally disposed between the display panel and the FPC, it is possible to determine the magnitude of a pressure exerted on the display panel by detecting the change value of capacitance between the upper electrode and the FPC electrode when an external force is exerted on the display panel, thereby overcoming the defect that the existing display device can not realize pressure detection, thus improving user experience.

Figure 5:
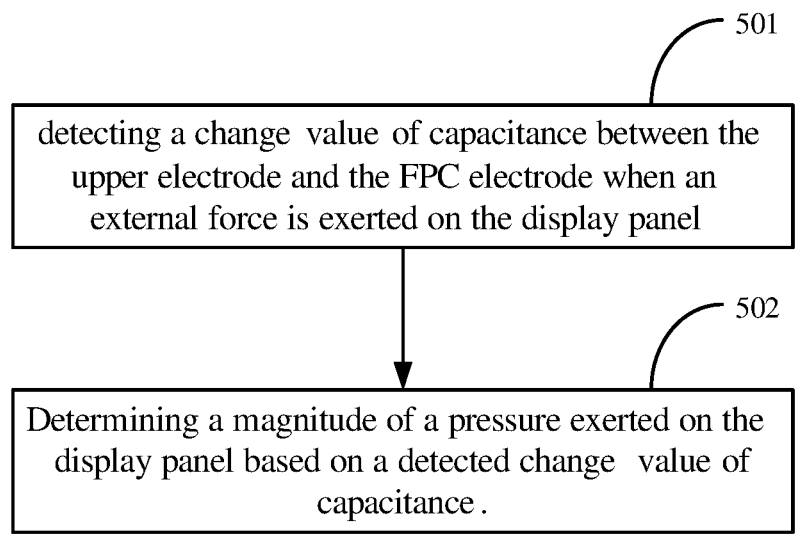
FIG. 5 is a flow chart of a pressure detecting method according to an embodiment of the present application.

According to another embodiment of the present application, there is provided a pressure detecting method suitable for the display device described above with reference to FIG. 2. Specifically, as shown in FIG. 5, a flow chart of a pressure detecting method according to an embodiment of the present application is shown. The method comprises:

Step 501: detecting a change value of capacitance between the upper electrode 15 and the FPC electrode 14 when an external force is exerted on the display panel 11.

Specifically, when the external force is exerted on the display panel 11, the elastically deformable dielectric material 16 will be compressed and deformed under the pressure, which may change a distance between the upper electrode 15 and the FPC electrode 14, thereby changing the capacitance therebetween.

Figure 6:
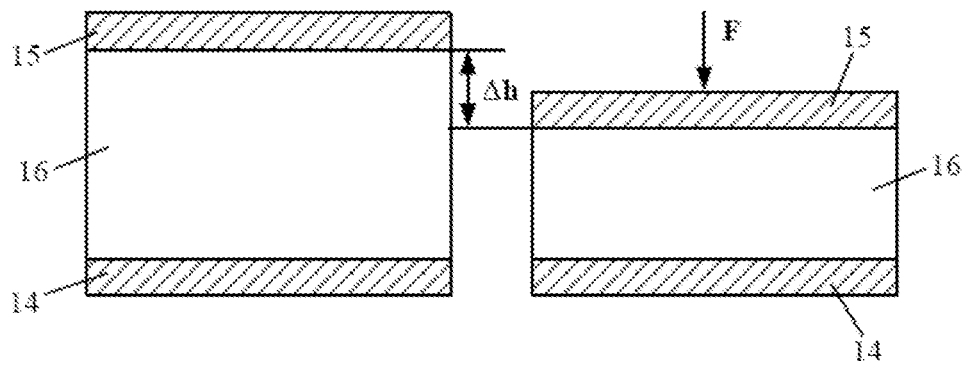
FIG. 6 is a principle diagram of a capacitive pressure sensor.

That is, a capacitor formed by the upper electrode 15, the FPC electrode 14 and the elastically deformable dielectric material 16 may be used to detect the pressure, for example, may be used as a capacitance-type pressure sensor. A principle of the capacitance-type pressure sensor is shown in FIG. 6. As shown in FIG. 6, the capacitance-type pressure sensor may be composed of two layers of metal plate electrodes such as the FPC electrode 14 and the upper electrode 15 of the embodiment of the present application and a dielectric between the two layers of metal plate electrodes such as the dielectric material 16 with the elastically deformation performance of the embodiment of the present application. When a pressure F is exerted on the two layers of metal plate electrodes, the dielectric material will be compressed and deformed under the pressure, which causes the distance between the two layers of metal plate electrodes to be decreased by Δh. As can be known from the plate electrode equation $C=(\varepsilon \cdot S)/d$, when the distance between the two layers of metal plate electrodes is decreased, the capacitance will increase. For example, in the equation, decreasing d will result in the increased C.

Step S502: determining a magnitude of the pressure exerted on the display panel 11 based on the detected change value of capacitance.

That is, with the method according to the embodiment of the present application, when the external force is exerted on the display panel, it is possible to determine the magnitude of pressure exerted on the display panel by detecting the change value of capacitance between the upper electrode and the FPC electrode, thereby overcoming the defect that the existing display device can not realize pressure detection, thus improving user experience.

Figure 7:
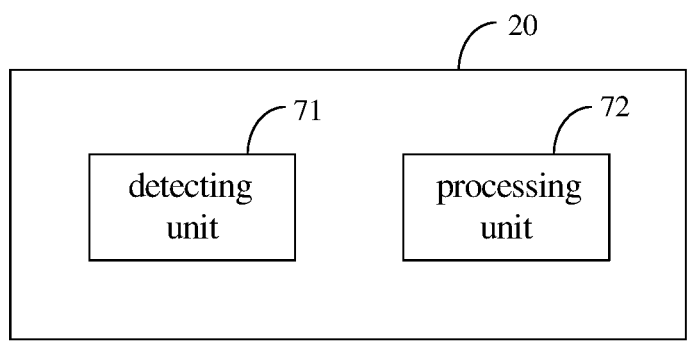
FIG. 7 is a schematic structural view of a pressure detecting device according to an embodiment of the present application.

Based on the same concept as that in the above embodiment, according to another embodiment of the present application, there is provided a pressure detecting device 20 suitable for the display device according to the preceding embodiment of the present application. FIG. 7 shows a schematic structural view of a pressure detecting device 20 according to an embodiment of the present application. As shown in FIG. 7, the pressure detecting device 20 may comprise: a detection unit 71 for detecting a change value of capacitance between the upper electrode 15 and the FPC electrode 14 when an external force is exerted on the display panel 11; and a processing unit 72 for determining a magnitude of the pressure exerted on the display panel 11 according to the detected change value of capacitance.

That is, in this embodiment of the present application, when the external force is exerted on the display panel, it is possible to determine the magnitude of pressure exerted on the display panel by detecting the change value of capacitance between the upper electrode and the FPC electrode, thereby overcoming the defect that the existing display device can not realize pressure detection, thus improving user experience.

Figure 8:
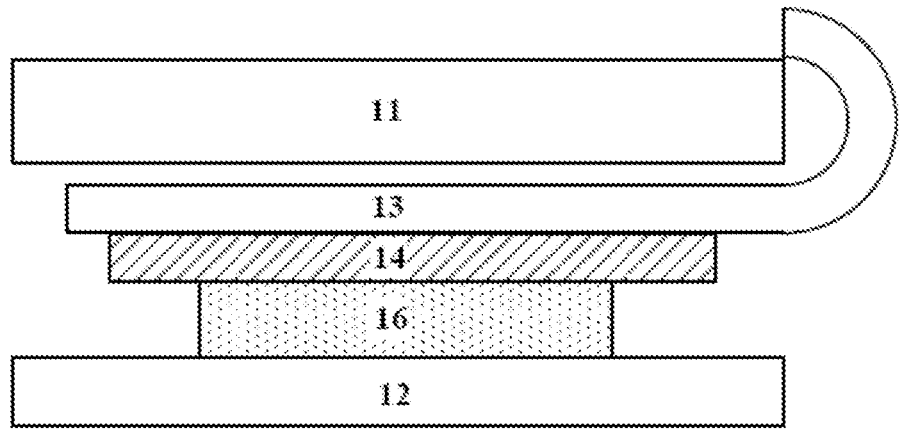
FIG. 8 is a schematic structural view of a display device according to an embodiment of the present application.

According to a further embodiment of the present application, there is provided another display device. Specifically, FIG. 8 shows a schematic structural view of a display device according to an embodiment of the present application. The display device may comprises a display panel 11, a support frame 12 for grounding, and a FPC board (FPC) 13 disposed between the display panel 11 and the support frame 12.

The display device may further comprise: a FPC electrode 14 disposed on a side of the FPC 13 facing the support frame 12 and an elastically deformable dielectric material 16 disposed between the FPC electrode 14 and the support frame 12 and contacting therewith respectively.

With this configuration, when an external force is exerted onto the display panel 11, the elastically deformable dielectric material 16 will be elastically deformed, which in turn reduces a distance between the FPC electrode 14 and the support frame 12, thereby changing a capacitance between the FPC electrode 14 and the support frame 12. Thus, it is possible to determine a magnitude of a pressure exerted on the display panel 11 by detecting a change value of capacitance between the FPC electrode 14 and the support frame 12, thereby overcoming the defect that the existing display cannot detect pressure, and thus improving user experience.

Other aspects of the present embodiment are similar to those of the preceding embodiments, and the descriptions thereof in detail are omitted.

With the display device according to this embodiment of the present application, since the FPC electrode disposed on the side of the FPC facing the support frame and the dielectric material with the elastically deformation performance disposed between the FPC electrode and the support frame and contacting therewith respectively are additionally disposed between the FPC and the support frame, it is possible to determine the magnitude of the pressure exerted on the display panel by detecting the change value of capacitance between the FPC electrode and the support frame when an external force is exerted on the display panel, thereby overcoming the defect that the existing display device can not realize pressure detection, thus improving user experience.

According to a further embodiment of the present application, there is provided a pressure detecting method suitable for the display device according to the preceding embodiment of the present application shown in FIG. 8.

Figure 9:
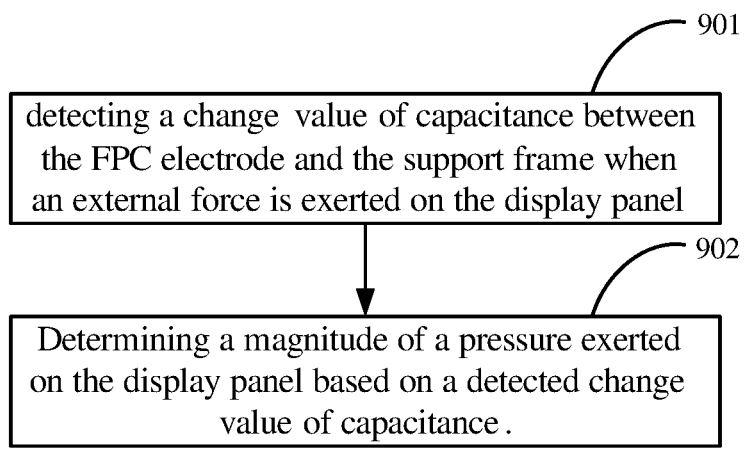
FIG. 9 is a flow chart of a pressure detecting method according to an embodiment of the present application.

Specifically, as shown in FIG. 9, a flow chart of a pressure detecting method according to an embodiment of the present application is shown. The method comprises:

Step 901: detecting a change value of capacitance between the FPC electrode 14 and the support frame 12 when an external force is exerted on the display panel 11.

Specifically, when the external force is exerted on the display panel 11, the dielectric material 16 with the elastically deformation performance will be compressed and deformed under the pressure, which may change a distance between the FPC electrode 14 and the support frame 12, thereby changing the capacitance therebetween.

Step S902: determining a magnitude of the pressure exerted on the display panel 11 according to the detected change value of capacitance.

That is, in this embodiment of the present application, when the external force is exerted on the display panel, it is possible to determine the magnitude of pressure exerted on the display panel by detecting the change value of capacitance between the FPC electrode and the support frame, thereby overcoming the defect that the existing display device can not realize pressure detection, thus improving user experience.

Figure 10:
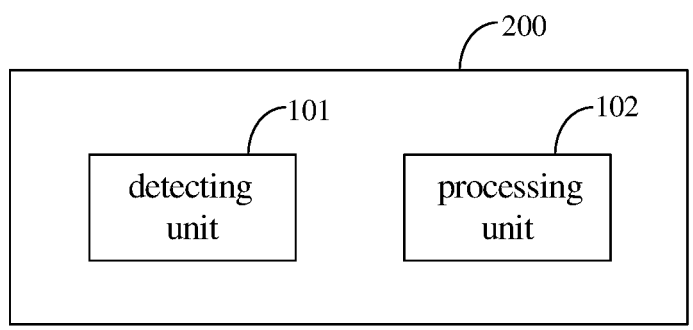
FIG. 10 is a schematic structural view of a pressure detecting device according to an embodiment of the present application.

Based on the same concept as that in the preceding embodiment, in another embodiment of the present application, there is provided a pressure detecting device 200 suitable for the display device according to the embodiment shown in FIG. 8 of the present application. FIG. 10 shows a schematic structural view of a pressure detecting device 200 according to an embodiment of the present application. As shown in FIG. 10, the pressure detecting device 200 may comprise: a detection unit 101 for detecting a change value of capacitance between the FPC electrode 14 and the support frame 12 when an external force is exerted on the display panel 11; and a processing unit 102 for determining a magnitude of the pressure exerted on the display panel 11 according to the detected change value of capacitance.

That is, in this embodiment of the present application, when the external force is exerted on the display panel, it is possible to determine the magnitude of pressure exerted on the display panel by detecting the change value of capacitance between the FPC electrode and the support frame, thereby overcoming the defect that the existing display device can not realize pressure detection, thus improving user experience.

It will be appreciated by those skilled in the art embodiments of the present application may be provided as a method, a device (an apparatus) or a computer program product. Thus, the present application may be implemented by a full hardware form, a full software form or a form of combination of hardware and software. Further, the present application may be in a form of a computer program product implemented in one or more computer readable mediums including, but not limited to, a magnetic disk storage, a CD-ROM, an optical storage and the like in which computer readable program codes are included.

The present application is described with reference to the flow charts and/or block diagrams of the method, the device (the apparatus) and the computer program product according to embodiments of the present application. It should be understood that each step and/or block in the flow chart and/or the block diagrams or the combination thereof can be implemented by computer program instructions. These computer program instructions may be provided to a general purpose computer, a special purpose computer, an embedded processor or a processor of other programmable data processing devices to generate a machine, so that the instructions performed by the computer or the processors of other programmable data processing devices generate a device for realizing functions designated in one or more steps in the flow chart diagram and/or one or more blocks in the block diagram.

These computer program instructions may also be stored in a computer readable storage instructing the computer or other programmable data process device to operate in a predetermined manner, so that the instructions stored in the computer readable storage generate a manufacturing product including an instruction device realizing the functions designated in the one or more steps in the flow chart diagram and/or one or more blocks in the block diagram.

These computer program instructions may also be loaded onto a computer or other programmable data process device to perform a series of operation steps on the computer or other programmable data process device to generate a process implemented by the computer so that the instructions performed on the computer or other programmable data process device can provide steps performing the functions designated in the one or more steps in the flow chart diagram and/or one or more blocks in the block diagram.

Although preferred embodiments of the present application have been disclosed, those skilled in the art can make changes or modifications to these embodiments once obtaining the basic inventive concept. Therefore, the appended claims are intended to be interpreted to include the preferred embodiments and all the changes and modifications falling within the scope of the present application.

Obviously, various changes or modifications may be made by those skilled without departing from the spirit and scope of the present application. Thus, if these changes or modifications fall within the scope of claims and their equivalents of the present application, the present application is also intended to include these changes or modifications.

What is claimed is:

1. A display device comprising:
   a display panel provided for displaying an image;
   a support frame for grounding; and
   a flexible printed circuit (FPC) board comprising:
      a bending portion electrically connected with the display panel; and
      a plane portion disposed between the display panel and the support frame, the bending portion and the plane portion being formed as a unitary structure,
   wherein the display device further comprises:
      a FPC electrode disposed on a side of the plane portion of the FPC board facing the display panel;
      an upper electrode configured for grounding and disposed on a side of the display panel facing the plane portion of the FPC board; and
      an elastically deformable dielectric material disposed between the FPC electrode and the upper electrode and contacting therewith respectively,
   wherein the FPC electrode and the upper electrode constitute a capacitor, and
   wherein the display panel, the upper electrode, the dielectric material, the FPC electrode, the plane portion of the FPC board, and the supporting frame are sequentially overlapped in a thickness direction of the display device.

2. The display panel according to claim 1, wherein the elastically deformable dielectric material is selected from one of foam, resin and rubber.

3. The display device according to claim 1, wherein the FPC electrode is a plate electrode; or
   the FPC electrode is a matrix-type electrode including a plurality of sub-electrodes arranged in a matrix form.

4. The display device according to claim 1, wherein
the upper electrode is a plate electrode; or
the upper electrode is a matrix-type electrode including a plurality of sub-electrodes arranged in a matrix form.

5. The display device according to claim 1, wherein
each of the FPC electrode and the upper electrode is a matrix-type electrode including a plurality of sub-electrodes arranged in a matrix form; and
the plurality of sub-electrodes of the upper electrode correspond to the plurality of sub-electrodes of the FPC electrode one by one.

6. The display device according to claim 1, wherein the upper electrode and the support frame are connected with each other by a conductive adhesive.

7. The display device according to claim 1, wherein the FPC electrode is connected to a wiring layer of the FPC board through a metal wiring so as to be connected with the FPC board.

8. A pressure detecting method for use with the display device according to claim 1, comprising steps of:
detecting a change value of capacitance between the upper electrode and the FPC electrode when an external force is exerted on the display panel; and
determining a magnitude of a pressure exerted on the display panel based on the detected change value of capacitance.

9. A display device comprising:
a display panel provided for displaying an image;
a support frame for grounding; and
a flexible printed circuit (FPC) board comprising:
a bending portion electrically connected with the display panel; and
a plane portion disposed between the display panel and the support frame, the bending portion and the plane portion being formed as a unitary structure,
wherein the display device further comprises:
a FPC electrode disposed on a side of the plane portion of the FPC board facing the support frame; and
an elastically deformable dielectric material disposed between the FPC electrode and the support frame and contacting therewith respectively,
wherein the FPC electrode and the support frame constitute a capacitor, and
wherein the display panel, the plane portion of the FPC board, the FPC electrode, the dielectric material, and the supporting frame are sequentially overlapped in a thickness direction of the display device.

10. The display device according to claim 9, wherein
the elastically deformable dielectric material is foam.

11. The display device according to claim 9, wherein
the FPC electrode is a plate electrode; or
the FPC electrode is a matrix-type electrode including a plurality of sub-electrodes arranged in a matrix form.

12. The display device according to claim 9, wherein the FPC electrode is connected to a wiring layer of the FPC board through a metal wiring so as to be connected with the FPC board.

13. A pressure detecting method for use with the display device according to claim 9, comprising steps of:
detecting a change value of capacitance between the FPC electrode and the support frame when an external force is exerted on the display panel; and
determining a magnitude of a pressure exerted on the display panel based on the detected change value of capacitance.

* * * * *